Patented Feb. 14, 1950

2,497,140

UNITED STATES PATENT OFFICE 2,497,140

METHOD OF MANUFACTURE OF LUMINESCENT MATERIALS

James H. Schulman, Cambridge, Mass., assignor to Sylvania Electric Products Inc., Salem, Mass., a corporation of Massachusetts No Drawing. Application March 28, 1946, Serial No. 657,922

8 Claims. (Cl. 252—301.6)

This invention relates to luminescent materials and more particularly to phosphors used in the preparation of a coating of fluorescent material for an electric gaseous discharge device, such as a fluorescent lamp.

An object of this invention is to provide a fluorescent material of fine and uniform particle size.

Another object is to provide a fluorescent material which, when applied to a lamp, will provide the lamp with a coating which will maintain good brightness throughout the life of the lamp.

A further object is to provide a fluorescent material which, when applied to a lamp, will provide the lamp with a smooth even coating.

Further objects, advantages and features will be apparent from the following specification.

In the preparation of certain luminescent materials it has been the practice to add an activator such as lead in order to obtain a product which will fluoresce under 2537 A. U. excitation. It has also been the practice, in some cases, in preparing luminescent materials to utilize a flux or catalyst to accelerate the reaction of phosphor synthesis. In both of these cases the activator and/or the catalyst have usually been mixed as a solid with the phosphor charge. In the case of the activator, many activator compounds fuse at comparatively low temperatures before any substantial reaction takes place with the phosphor ingredients. This sintering is undesirable because it causes the final phosphor product to be characterized by larger particle sizes than are desired. When a catalyst is mixed as a solid with the phosphor charge it has been found that sometimes the stimulated reaction of the fluorescent material does not take place uniformly throughout the entire mass, some particles of the fluorescent material reacting slower than others.

The method of my invention embodies the idea of introducing the activator and/or the catalyst into the phosphor charge in a vapor state instead of mixing in the activator and/or the catalyst in a solid state. I have found that when this is done sintering of the phosphor is avoided and finer particle sizes are obtainable; and in the case of the catalyst, the reaction of the fluorescent material compound is stimulated uniformly through the entire mass, all particles appearing to react at a more uniform rate.

Activators

The process which I have employed in synthesizing an activated phosphor, such as calcium lead silicate, for example, comprises firing a mixture of a calcium salt and a manganese salt with silicic acid in the presence of the vapor of a lead compound. This lead-bearing vapor may be produced in the firing chamber by placing therein a separate vessel containing a suitable lead compound. Alternatively, the activator compound may be disposed in the bottom of a suitable container and the phosphor charge piled on top of it or it may be disposed on top of the phosphor charge. If desired, a blend of a calcium and a manganese compound with silicic acid can be prefired to give $CaMnSiO_3$ which is inert to 2537 A. U. radiation. This fired material may then be further heated in the vapor of a suitable lead compound, whereupon lead enters the structure and forms the $CaPbMnSiO_3$ phosphor which fluoresces pink under 2537 A. U. excitation.

The amount of the activator which enters the phosphor may be controlled by the temperature and time of firing and by the choice of activator compounds of different vapor pressures. As suitable lead compounds I have used lead fluoride, lead dioxide, lead monoxide and lead chloride, but any other lead compounds giving a sufficient concentration of lead-bearing vapor at the firing temperatures employed are satisfactory. I have found 2100° F. to be a satisfactory firing temperature. Thus an activator can be added to a raw material blend or a finished phosphor by this method.

In the preferred embodiment of my process I place a blend of $CaCO_3$, $MnCO_3$, and $SiO_2$ or prefired $CaMnSiO_3$ in one crucible and a suitable lead compound in another crucible. I then put these two crucibles in an oven or firing chamber with the lead compound crucible on top of the phosphor charge. The crucibles are then covered and fired. When the temperature reaches a point where the lead compound starts to vaporize, lead-bearing vapor permeates the blend of $CaCO_3$, $MnCO_3$, and $SiO_2$ or prefired $CaMnSiO_3$. The resultant phosphor has proved highly satisfactory in the preparation of a suspension of luminescent material to be applied to the walls of a glass tube to be manufactured into a fluorescent lamp, because a finer particle size and a lower powder weight is thereby obtained. The lower powder weight reduces manufacturing costs and the finer particle size provides a smoother coating on the lamp.

The principle of vapor-phase activators may be extended to activators other than lead without departing from the spirit of the invention.

Catalysts

The action of catalysts in promoting solid state reactions is well known. Such agents have been used in the synthesis of sulfide and silicate phosphors. In both cases the catalyst has usually been mixed as a solid with the material to be reacted. With reference to catalyst-accelerated silicate reactions, a theory has been advanced that the catalyst dissolves away a barrier layer of reacted silicate, thus uncovering the underlying unreacted metal oxides which can further react.

In the method of my invention volatile fluxing agents are not admixed as a solid with the phosphor charge but their vapors alone are sufficient to adequately accelerate the reaction of phosphor synthesis. A flux, such as cadmium chloride, may be placed in the bottom of a firing vessel and the phosphor blend to be fired piled on top of it or it may be disposed on top of the phosphor blend. Alternatively, the phosphor mix and the flux may be disposed in separate containers, so long as the flux vapor has good access to the phosphor charge. Since the vapors alone perform the catalysis, this action is different from that normally ascribed to fluxes, the vapors not being able to dissolve any barrier layer of silicate.

I have found the above-mentioned process extremely satisfactory in the synthesis of manganese-activated silicate phosphor when one of the volatile halides is used as a fluxing agent. For example, I have prepared zinc ortho-silicate activated with manganese by firing a dry blend of ZnO, $MnCO_3$ and $SiO_2$ in the presence of a volatile halide such as $CdCl_2$, $ZnCl_2$, $PbCl_2$, and HgCl. This method has also been found advantageous in the preparation of zinc beryllium silicate activated with manganese, magnesium orthosilicate activated with manganese and cadmium silicate activated with manganese when the dry blend of the phosphor charge is fired in the presence of a volatile halide, such as one of the halide compounds mentioned above for example.

The fluxing agent may be placed in a container separate from the container in which the phosphor charge is disposed or it may be placed in the bottom of the same vessel in which the phosphor charge is fired. Although it is possible to fire the materials in open containers where no provision is made to prevent escape of the flux vapor it is not the preferred method. Preferably provision should be made to prevent the escape of the volatilized material by firing the charge in a closed container.

The principle of vapor-phase catalysts may also be extended to sulfide and other type phosphors without departing from the spirit of the invention.

What I claim is:

1. The process of preparing a manganese activated silicate phosphor selected from the group consisting of zinc orthosilicate, zinc beryllium silicate, magnesium orthosilicate, cadmium silicate and calcium silicate which comprises disposing the components thereof, in the solid state, in the proportions necessary to form the phosphor, in an enclosed chamber; disposing at least one compound selected from the group consisting of $CdCl_2$, $ZnCl_2$, HgCl, $PbCl_2$, $PbF_2$, PbO, and $PbO_2$, in the solid state, in said chamber, physically separate from said components but in close proximity thereto; and heating said components and said compound to a temperature high enough to vaporize said compound and cause said vapors to permeate the solid state components of said phosphor.

2. The process of preparing a manganese activated calcium silicate phosphor which comprises disposing a blend of $CaCO_3$, $MnCO_3$, and $SiO_2$, in the solid state, in the proportions necessary to form the phosphor, in an enclosed chamber; disposing at least one compound selected from the group consisting of $CdCl_2$, $ZnCl_2$, HgCl, $PbCl_2$, $PbF_2$, PbO, and $PbO_2$, in the solid state, in said chamber physically separate from said blend but in close proximity thereto; and heating said blend and said compound to a temperature high enough to vaporize said compound and cause said vapors to permeate the solid state blend of said phosphor.

3. The process of preparing a manganese activated silicate phosphor selected from the group consisting of zinc orthosilicate, zinc beryllium silicate, magnesium orthosilicate, cadmium silicate and calcium silicate which comprises disposing the components thereof, in the solid state, in the proportions necessary to form the phosphor, in an enclosed chamber; disposing lead oxide in the solid state, in said chamber physically separate from said components but in close proximity thereto; and heating said components and said lead oxide to a temperature high enough to vaporize said lead oxide and cause said vapors to permeate the solid state components of said phosphor.

4. The process of preparing a manganese activated calcium silicate phosphor which comprises disposing a blend of $CaCO_3$, $MnCO_3$ and $SiO_2$, in the solid state, in the proportions necessary to form the phosphor, in an enclosed chamber; disposing lead oxide in the solid state, in said chamber physically separate from said blend but in close proximity thereto; and heating said blend and said lead oxide to a temperature high enough to vaporize said lead oxide and cause said vapor to permeate the solid state blend of said phosphor.

5. The process of preparing a manganese activated silicate phosphor selected from the group consisting of zinc orthosilicate, zinc beryllium silicate, magnesium, orthosilicate, cadmium silicate and calcium silicate which comprises disposing the components thereof, in the solid state, in the proportions necessary to form the phosphor, in an enclosed chamber; disposing $PbCl_2$ in the solid state, in said chamber, physically separate from said components but in close proximity thereto; and heating said components and said $PbCl_2$ to a temperature high enough to vaporize said $PbCl_2$ and cause said vapors to permeate the solid state components of said phosphor.

6. The process of preparing a manganese activated calcium silicate phosphor which comprises disposing a blend of $CaCO_3$, $MnCO_3$ and $SiO_2$, in the solid state, in the proportions necessary to form the phosphor in an enclosed chamber; disposing $PbCl_2$ in the solid state, in said chamber physically separate from said blend but in close proximity thereto; and heating said blend and said $PbCl_2$ to a temperature high enough to vaporize said $PbCl_2$ and cause said vapor to permeate the solid state blend of said phosphor.

7. The process of preparing a manganese activated silicate phosphor selected from the group consisting of zinc orthosilicate, zinc beryllium silicate, magnesium orthosilicate, cadmium silicate and calcium silicate which comprises disposing the components thereof, in the solid state, in the proportions necessary to form the phosphor, in an enclosed chamber; disposing $PbF_2$ in the solid state, in said chamber, physically separate from said components but in close proximity thereto; and heating said components and said $PbF_2$ to a temperature high enough to vaporize said $PbF_2$ and cause said vapors to permeate the solid state components of said phosphor.

8. The process of preparing a manganese activated calcium silicate phosphor which comprises disposing a blend of $CaCO_3$, $MnCO_3$, and $SiO_2$, in the solid state, in the proportions necessary to form the phosphor, in an enclosed chamber; disposing $PbF_2$ in the solid state, in said chamber physically separate from said blend but in close proximity thereto and heating said blend and said $PbF_2$ to a temperature high enough to vaporize said $PbF_2$ and cause said vapor to permeate the solid state blend of said phosphor.

JAMES H. SCHULMAN.

REFERENCES CITED

The following references are of record in the file of this patent:

UNITED STATES PATENTS

| Number | Name | Date |
|---|---|---|
| 1,954,691 | De Boer | Apr. 10, 1934 |
| 2,124,225 | Batchelor | July 19, 1938 |
| 2,238,026 | Moore | Apr. 8, 1941 |
| 2,247,192 | Fonda | June 24, 1941 |
| 2,254,956 | Aschermann | Sept. 2, 1941 |
| 2,299,510 | Steadman | Oct. 20, 1942 |
| 2,462,517 | Leverenz | Feb. 22, 1949 |